US007884871B2

(12) United States Patent
Smith et al.

(10) Patent No.: US 7,884,871 B2
(45) Date of Patent: Feb. 8, 2011

(54) IMAGES WITH HIGH SPEED DIGITAL FRAME TRANSFER AND FRAME PROCESSING

(75) Inventors: Scott Smith, Los Angeles, CA (US); Richard L. Baer, Los Altos, CA (US); Laura Savidge, Sunnyvale, CA (US)

(73) Assignee: Aptina Imaging Corporation, George Town (KY)

( * ) Notice: Subject to any disclaimer, the term of this patent is extended or adjusted under 35 U.S.C. 154(b) by 647 days.

(21) Appl. No.: 11/763,512

(22) Filed: Jun. 15, 2007

(65) Prior Publication Data
US 2008/0309810 A1 Dec. 18, 2008

(51) Int. Cl.
H04N 3/14 (2006.01)
H01L 31/062 (2006.01)
H01L 27/00 (2006.01)

(52) U.S. Cl. ............... 348/308; 257/292; 250/208.1
(58) Field of Classification Search ............... None
See application file for complete search history.

(56) References Cited

U.S. PATENT DOCUMENTS

| | | | |
|---|---|---|---|
| 5,430,481 A | | 7/1995 | Hynecek |
| 5,926,219 A | | 7/1999 | Shimizu |
| 5,969,759 A | | 10/1999 | Morimoto |
| 6,140,630 A | * | 10/2000 | Rhodes ............... 250/208.1 |
| 6,204,524 B1 | * | 3/2001 | Rhodes ............... 257/222 |
| 6,310,366 B1 | * | 10/2001 | Rhodes et al. ....... 257/185 |
| 6,326,652 B1 | * | 12/2001 | Rhodes ............... 257/231 |
| 6,333,205 B1 | * | 12/2001 | Rhodes ............... 438/69 |
| 6,376,868 B1 | * | 4/2002 | Rhodes ............... 257/215 |
| 6,665,012 B1 | * | 12/2003 | Yang et al. ........... 348/308 |
| 6,801,258 B1 | | 10/2004 | Pain et al. |
| 6,809,766 B1 | * | 10/2004 | Krymski et al. ....... 348/296 |
| 6,885,400 B1 | | 4/2005 | Vodanovic |
| 6,946,635 B1 | | 9/2005 | Pine |
| 7,015,941 B2 | | 3/2006 | Desormeaux |
| 7,031,556 B1 | | 4/2006 | Etoh |
| 7,084,915 B1 | | 8/2006 | Sato |
| 7,223,956 B2 | | 5/2007 | Yoshida |
| 7,265,784 B1 | * | 9/2007 | Frank ................. 348/241 |
| 7,362,355 B1 | * | 4/2008 | Yang et al. ........... 348/222.1 |

(Continued)

FOREIGN PATENT DOCUMENTS

EP     1 033 868 A1     9/2000

(Continued)

OTHER PUBLICATIONS

Bennett Wilburn et al., "High-Speed Videography Using a Dense Camera Array," IEEE Computer Society Conference on Computer Vision and Pattern Recognition, 2004 IEEE, vol. 2, pp. II-294-II-301.

(Continued)

*Primary Examiner*—Justin P Misleh

(57) ABSTRACT

A digital frame transfer imager having an image sensor and frame memory in the same chip. The image sensor has an integrated memory controller for controlling transfers of data between the sensor and the memory array. The imager utilizes a rolling shutter and multiple groups of analog-to-digital processing circuitry to readout data from the sensor and to output digital images substantially free from image smear, kT/C noise and other unwanted image artifacts.

17 Claims, 14 Drawing Sheets

U.S. PATENT DOCUMENTS

| | | | |
|---|---|---|---|
| 7,488,928 B2 * | 2/2009 | Krymski | 250/208.1 |
| 7,570,293 B2 * | 8/2009 | Nakamura | 348/308 |
| 7,623,173 B2 * | 11/2009 | Nitta et al. | 348/302 |
| 7,659,925 B2 * | 2/2010 | Krymski | 348/222.1 |
| 2003/0112473 A1 | 6/2003 | Robins et al. | |
| 2004/0001153 A1 | 1/2004 | Kikukawa | |
| 2004/0100564 A1 | 5/2004 | Voss et al. | |
| 2004/0223075 A1 | 11/2004 | Furlan et al. | |
| 2006/0092303 A1 | 5/2006 | Pearson | |
| 2006/0119721 A1 | 6/2006 | Blerkom | |
| 2006/0140615 A1 | 6/2006 | Suzuki | |
| 2006/0198624 A1 | 9/2006 | Ono | |
| 2006/0238632 A1 | 10/2006 | Shah | |
| 2007/0001098 A1 | 1/2007 | Sano | |
| 2007/0085925 A1 | 4/2007 | Schroderus | |

FOREIGN PATENT DOCUMENTS

| | | |
|---|---|---|
| EP | 1 037 458 A1 | 9/2000 |
| EP | 1 119 189 A2 | 7/2001 |
| EP | 1 257 117 A2 | 11/2002 |
| EP | 1 318 668 A2 | 6/2003 |
| EP | 1 257 117 A3 | 12/2004 |
| EP | 1 566 959 A2 | 8/2005 |
| JP | 2006-058945 | 3/2006 |
| JP | 2006-262336 | 9/2006 |
| KR | 950002194 | 3/1995 |
| WO | WO 99/05853 | 2/1999 |
| WO | WO 00/30343 | 5/2000 |

OTHER PUBLICATIONS

Nenad Stevanovic et al., "A CMOS Image Sensor for High-Speed Imaging," Solid-State Circuits Conference, 2000. Digest of Technical Papers. ISSCC. 2000 IEEE International, pp. 104-105, 449.

Marci Meingast et al., "Geometric Models of Rolling-Shutter Cameras," Mar. 29, 2005.

* cited by examiner

IMAGES WITH HIGH SPEED DIGITAL FRAME TRANSFER AND FRAME PROCESSING

FIELD OF THE INVENTION

Embodiments of the invention relate to semiconductor imaging devices and more particularly to imagers with high speed digital frame transfer.

BACKGROUND OF THE INVENTION

The exposure of an image detector such as an image sensor must be controlled to prevent overexposure, which causes clipping, and underexposure which results in excessive noise. Exposure control is generally accomplished by a shutter that blocks light when it is closed, and allows light to pass when it is open. Aperture control and neutral density filters can be used to reduce the intensity of light, and to allow the image detector to build up its exposure more gradually. However, virtually all cameras implement shutters.

In film cameras, the shutter is a mechanical mechanism. It can range in complexity from a simple spring-loaded pinhole punched in a dark plate to the complicated multiple-blade single-lens reflex (SLR) structure. These shutters are not fast enough, or reliable enough, to operate at high frame rates. Accordingly, electronic video cameras typically utilize electronic shutters and not mechanical shutters.

A number of different electronic shutters have been implemented in CCD and CMOS image sensors. CCD image sensors typically use a "global" shutter, meaning that all of the pixels in the image sensor are exposed to the image at the same time. The most common CCD shutter techniques are frame transfer (FT), interline transfer (IT), and a hybrid of both techniques known as frame interline transfer (FIT).

A basic full frame (FF) CCD image sensor 10 is illustrated in FIG. 1. The basic full frame CCD image sensor 10 has no shutter mechanism. Photocharge accumulates in photosensors (typically photodiodes) within vertical registers 12. The photocharge is transferred to a horizontal register 14 before being clocked out of the sensor 14 as an image output. Because this process operates at a slow rate (approximately 200 nsec/pixel or 50 microseconds per row), the accumulation of charge in the vertical register 12 causes vertical streaks to appear in the output image. The streaks are known in the art and are often referred to as "smear."

A frame transfer CCD image sensor 30 is illustrated in FIG. 2. This sensor 30 includes an image area 32 comprising vertical registers 12 for capturing the image and a storage area 34 also comprising vertical registers 36 for storing the image captured in the image area 32. The use of the storage area 34 is designed to reduce smear. Photocharge is transferred from the image area 32 to the storage area 34 rapidly, and then read out from the storage area 34 at the normal rate. Smear can be substantially reduced, but cannot be entirely eliminated. In addition, this type of image sensor 30 is costly because the area of the sensor 30 is roughly doubled. Moreover, the image may also be corrupted by dark current while it is being stored. Dark current is the phenomenon whereby current is generated as a photodiode/photosensor signal even though there is an absence of light and no signal should be present.

An interline transfer CCD image sensor 50 is illustrated in FIG. 3. This sensor 50 collects photocharge in photodiodes 56 that are separate from the vertical registers 52. The vertical registers 52 are masked with metal 58 to prevent charge accumulation and reduce smear. The transfer of charge from the photodiodes 56 to the vertical registers 52 can be accomplished rapidly. However, it is burdensome and extremely difficult (if not impossible) to completely mask the vertical register 52 structures from light. Accordingly, some smear remains in the image output.

FIG. 4 illustrates a frame interline transfer (FIT) CCD image sensor 70, which is essentially a combination of the frame and interline transfer image sensors 30 (FIG. 2), 50 (FIG. 3). That is, the FIT CCD image sensor 70 includes an image area 72 and a storage area 74, like the frame transfer image sensor 30 (FIG. 2). The storage area 74 includes vertical registers 76 that output to a horizontal register 14 as described above. Similar to the interline transfer CCD image sensor 50 (FIG. 3), the image area 72 of the FIT CCD image sensor 70 uses photodiodes 56 that are separate from the vertical registers 52. In addition, the vertical registers 52 of the image area 72 and the vertical registers 76 of the storage area 74 are masked with metal 78 to prevent charge accumulation and to reduce smear. As can be appreciated, however, the frame interline transfer CCD image sensor 70 is relatively expensive and is generally used only in commercial broadcast cameras.

Currently, there is a movement towards using CMOS image sensors as low cost imaging devices. A CMOS image sensor includes a focal plane array of pixels, each one of the pixels including a photosensor, for example, a photogate, photoconductor or a photodiode for accumulating photo-generated charge. Each pixel has a charge storage region, which is connected to the gate of an output transistor that is part of a readout circuit. The charge storage region may be constructed as a floating diffusion region. In some image sensor circuits, each pixel may include at least one electronic device such as a transistor for transferring charge from the photosensor to the storage region and one device, also typically a transistor, for resetting the storage region to a predetermined charge level.

In a CMOS image sensor, the active elements of a pixel perform the functions of: (1) photon to charge conversion; (2) accumulation of image charge; (3) resetting the photosensor and storage region to a known state; (4) transfer of charge to the storage region; (5) selection of a pixel for readout; and (6) output and buffering of a signal representing pixel charge. Photocharge may be amplified when it moves from the initial charge accumulation region to the storage region. The charge at the storage region is typically converted to a pixel output voltage by the source follower output transistor.

CMOS image sensors of the type discussed above are generally known as discussed, for example, in U.S. Pat. Nos. 6,140,630, 6,376,868, 6,310,366, 6,326,652, 6,204,524 and 6,333,205, assigned to Micron Technology, Inc.

A typical four transistor (4T) CMOS image pixel 100 is shown in FIG. 5. The pixel 100 includes a photosensor 102, implemented as a pinned photodiode, transfer transistor 104, floating diffusion region FD, reset transistor 106, source follower transistor 108 and row select transistor 110. The photosensor 102 is connected to the floating diffusion region FD by the transfer transistor 104 when the transfer transistor 104 is activated by a transfer gate control signal TX. Capacitor 112 represents the floating diffusion region FD. Photosensor charge is converted to a voltage on this capacitor 112.

The reset transistor 106 is connected between the floating diffusion region FD and a pixel supply voltage Vpix. A reset control signal RST is used to activate the reset transistor 106, which resets the floating diffusion region FD to the pixel supply voltage Vpix level as is known in the art. The source follower transistor 108 has its gate connected to the floating diffusion region FD and is connected between the supply voltage Vpix and the row select transistor 110. The source follower transistor 108 buffers the floating diffusion region FD and keeps the charge from leaking out while transferring the electrical output signal to OUTPUT. The row select transistor 110 is controllable by a row select signal ROW for selectively connecting the source follower transistor 108 and the output voltage signal OUTPUT to a column line 114 of a pixel array.

Two different shutter methods can be implemented in CMOS image sensors to operate the pixel 100. In a global shutter operating methods, all of the photosensors 102 in a pixel array accumulate charge over the same time interval. In the global shutter method, the reset transistor 106 and transfer transistor 104 of all pixels 100 are operated simultaneously. The reset and transfer transistors 106, 104 are turned on (i.e., activated), initially, to reset all of the pixels 100 to Vpix. Charge integration (also known as the integration period) begins when the transfer and reset transistors 106, 104 are turned off (i.e., deactivated). At the end of the integration period, the transfer transistor is turned on (via the TX signal), and photocharge flows to the floating diffusion region FD. Typically, the floating diffusion region FD is masked by e.g., metal to limit the further accumulation of charge at the region FD. Photocharge remains on the floating diffusion region FD until it is read out by activating the row select transistor 110 (via the ROW signal) and output on the column line 114. Because it is difficult to keep stray light from reaching the floating diffusion region FD, the global shutter method of operating a CMOS image sensor also suffers from smear. As is known in the art, the CMOS image sensor also suffers from kT/C noise because correlated double sampling is not performed when using the global shutter mode of operation.

In the rolling shutter operational method/mode, the exposure interval varies from row to row. The first row in the array begins integrating first, and then the next rows sequentially begin integrating. The last row in the array will integrate last. The integration period is the same for all rows. The image is substantially free of image smear when the image sensor is operated in the rolling shutter mode. Moreover, kT/C noise may be eliminated because correlated double sampling may be used with a rolling shutter. If there is any motion in the scene, however, the varying integration interval causes motion artifacts to appear. The artifacts typically distort the shape of a moving object such as e.g., a square is often distorted into a parallelogram. The degree of distortion depends on the speed of the object relative to the readout speed of the image sensor; as can be appreciated, high readout speeds are necessary to minimize this affect.

CCD and CMOS image sensors are often used in digital single-lens reflex (DSLR) cameras. DSLR cameras have evolved from conventional film SLR cameras. In a DSLR camera, the film is replaced with a CCD or CMOS image sensor that sits in the film plane. Exposure is controlled by a fast mechanical multiple-blade focal-plane shutter 150, as shown in FIG. 6. The blades 152, 154 of the shutter 150 travel across the focal plane of the image sensor 160 at high speed (e.g., approximately 1/240th of a second). The blades 152, 154 travel in the direction of arrow 156. The imager sensor's 160 exposure time is determined by the gap 158 between the edges of the leading and trailing blades 152, 154, and the speed of the shutter 150. This type of exposure method is analogous to the rolling shutter mode of operation for a CMOS image sensor. In fact, the motion artifacts induced by the shutter method illustrated in FIG. 6 and the rolling shutter method are identical.

Accordingly, there is a need and desire for a CMOS sensor that captures images substantially free of smear and kT/C noise in which motion artifacts are negligible.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

Embodiments disclosed herein provide a CMOS image sensor that captures images substantially free of smear and kT/C noise and in which motion artifacts are substantially minimized. The embodiments are analogous to frame transfer techniques except that they use a rolling shutter operational method and a digital memory integrated with the image sensor (either in the same chip or in the same package). The embodiments may be referred to as implementing a digital frame transfer and/or a digital frame transfer imager.

The embodiments disclosed herein improve upon typical CMOS image sensor rolling shutter operation, whose output images often suffer from motion artifacts. In conventional CMOS image sensors, the speed of the rolling shutter operation is typically limited by the time required to transfer the image data out of the sensor. In the disclosed embodiments of the digital frame transfer imager, the rolling shutter limitation is overcome. In addition, the rolling shutter operation of the imager disclosed herein is fast enough to obviate the need for a mechanical shutter.

Figure 1:
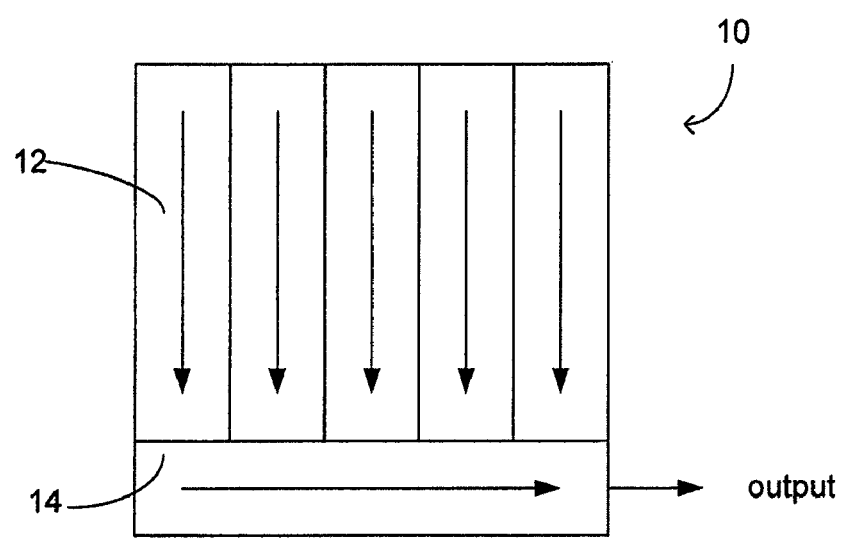
FIG. 1 illustrates a basic full frame CCD image sensor.
Figure 2:
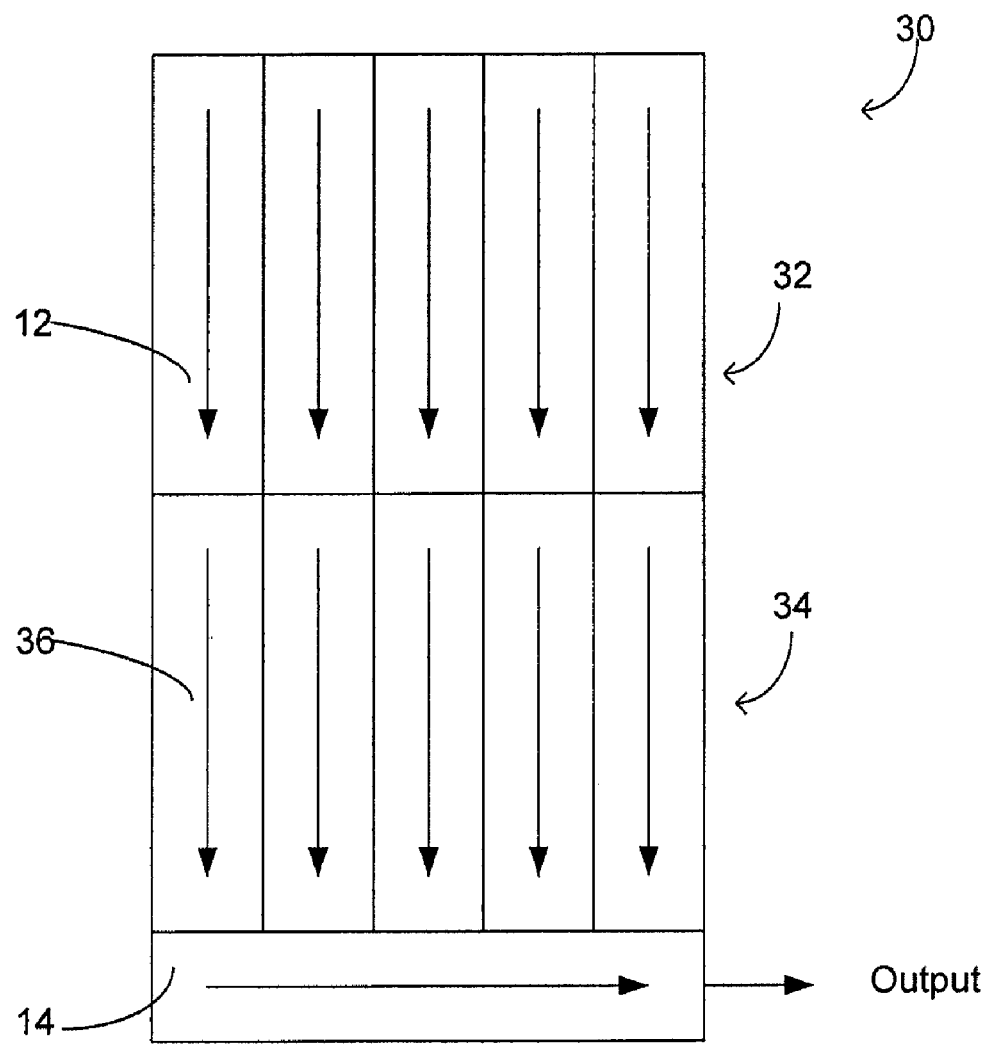
FIG. 2 illustrates a frame transfer CCD image sensor.
Figure 3:
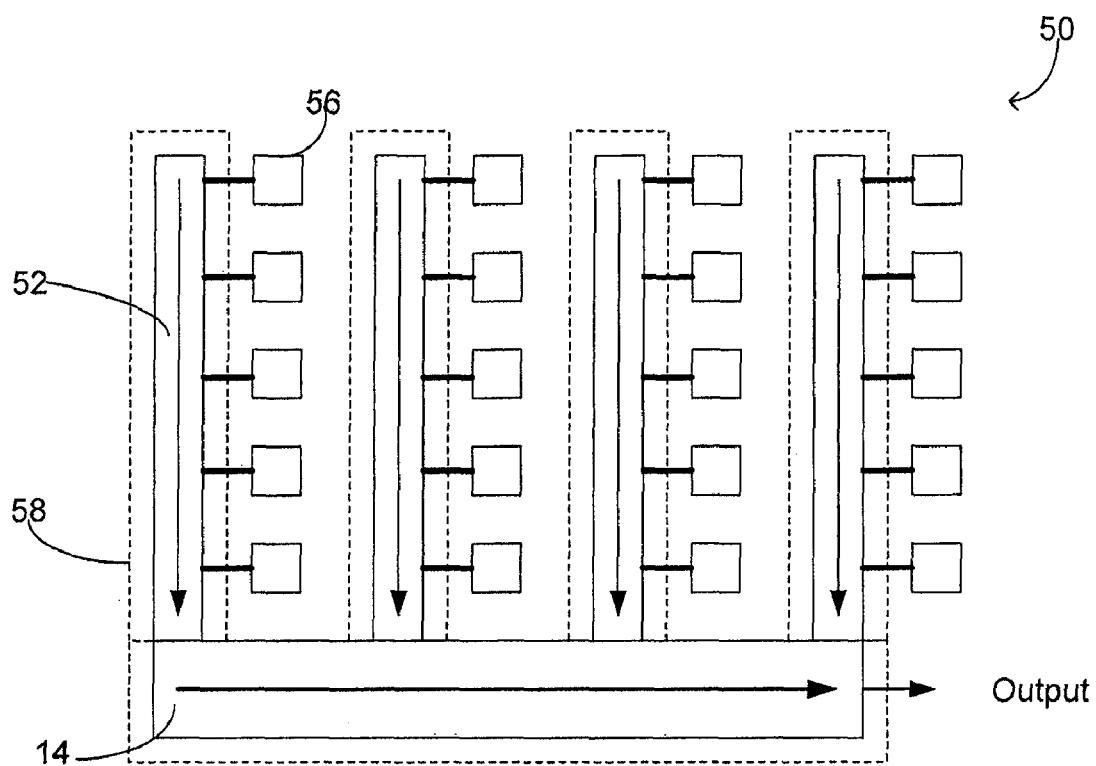
FIG. 3 illustrates an interline transfer CCD image sensor.
Figure 4:
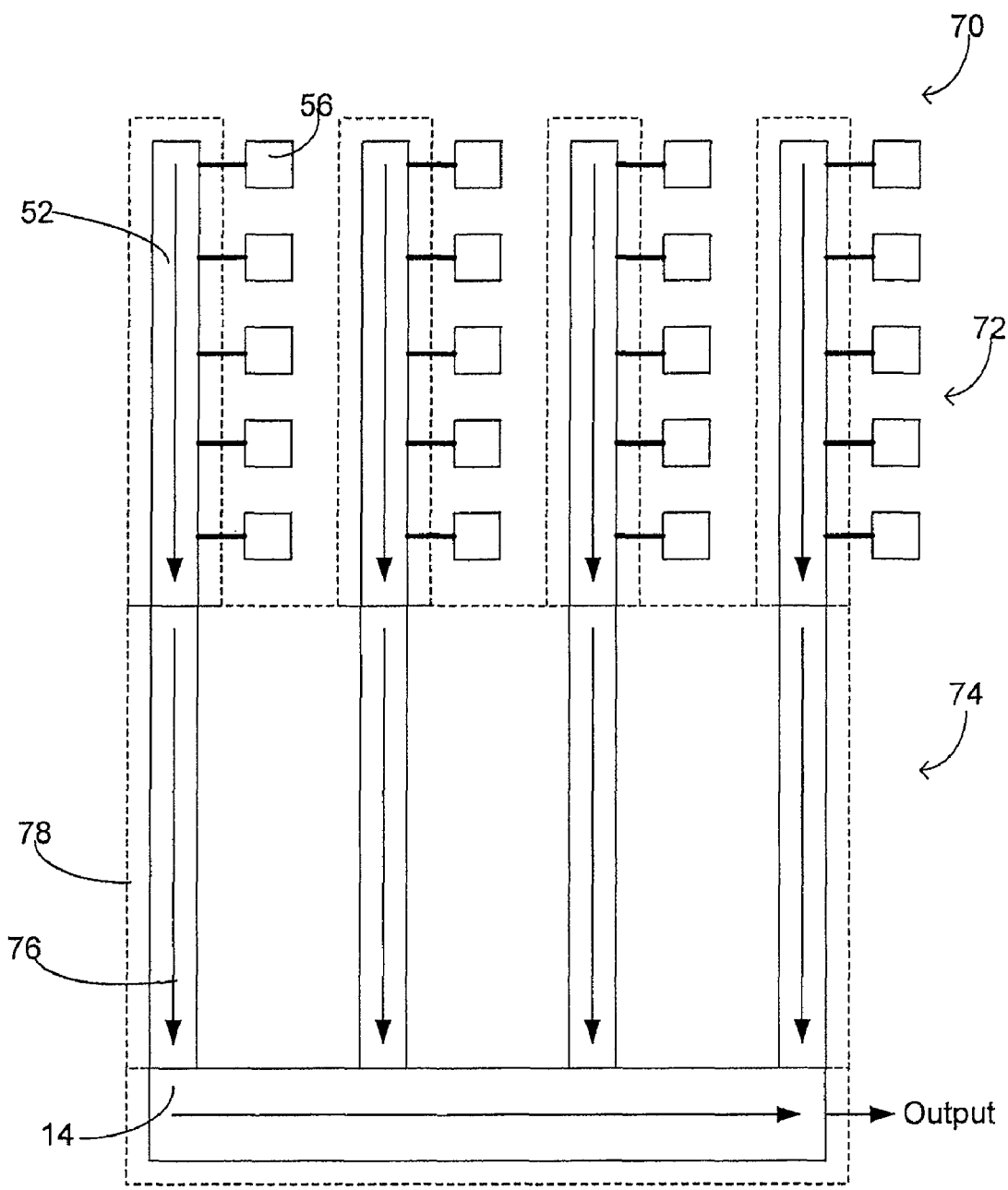
FIG. 4 illustrates a frame interline transfer (FIT) CCD image sensor.
Figure 5:
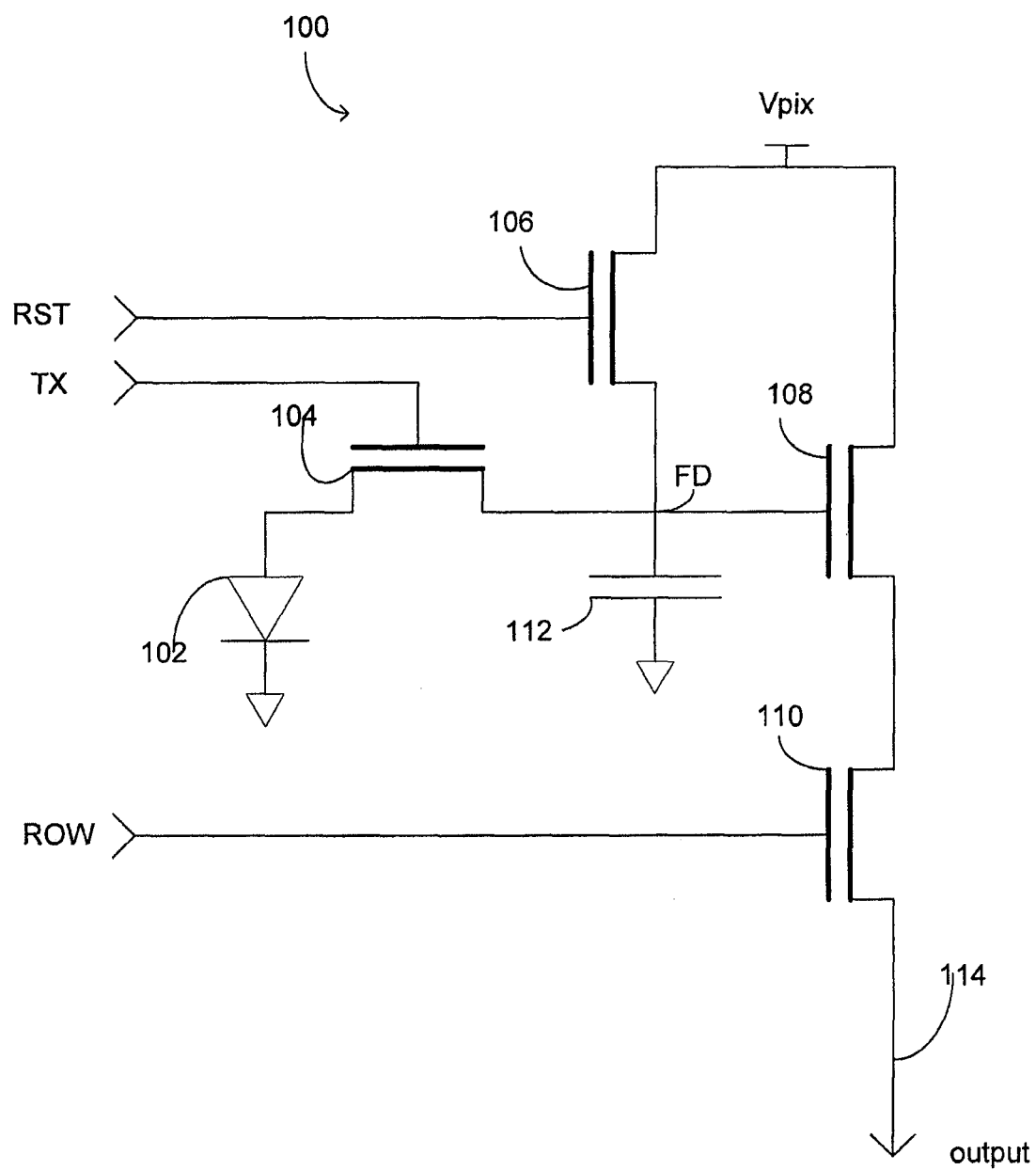
FIG. 5 illustrates a typical four transistor CMOS image pixel.
Figure 6:
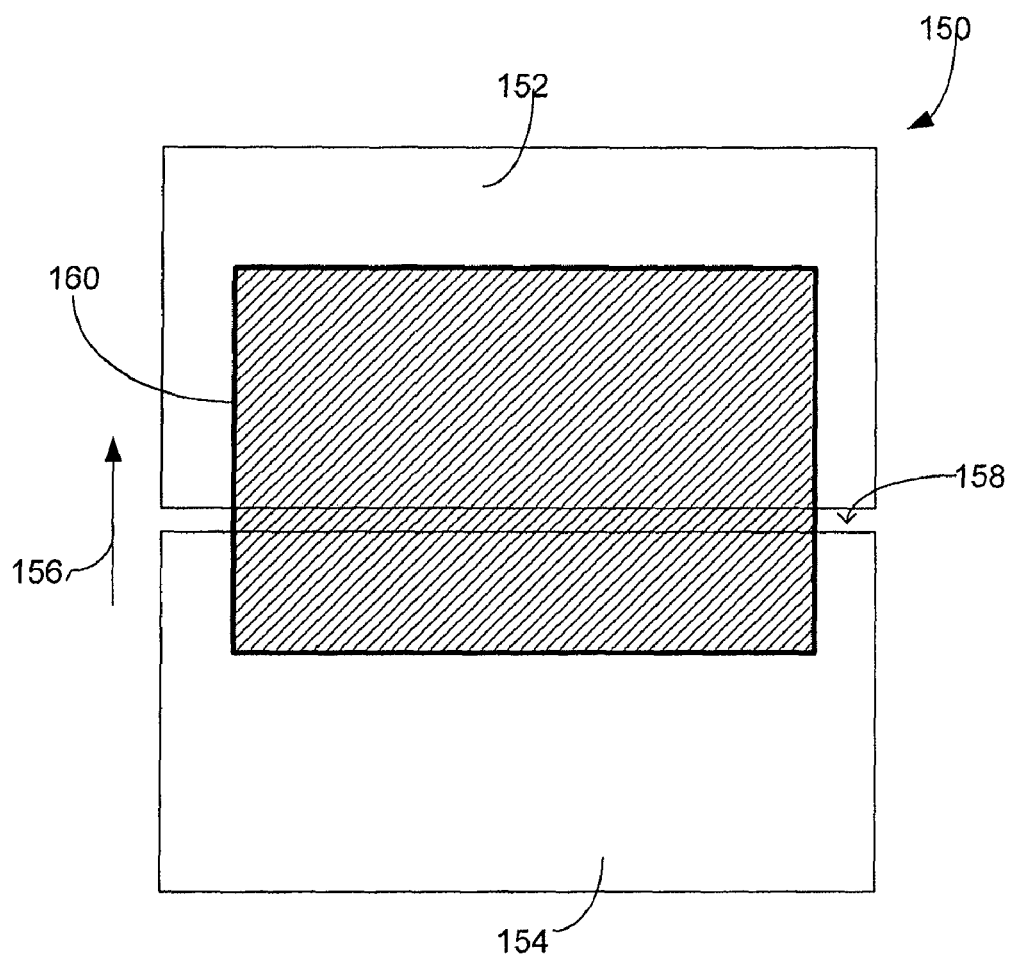
FIG. 6 illustrates a multiple-blade focal-plane shutter.
Figure 7:
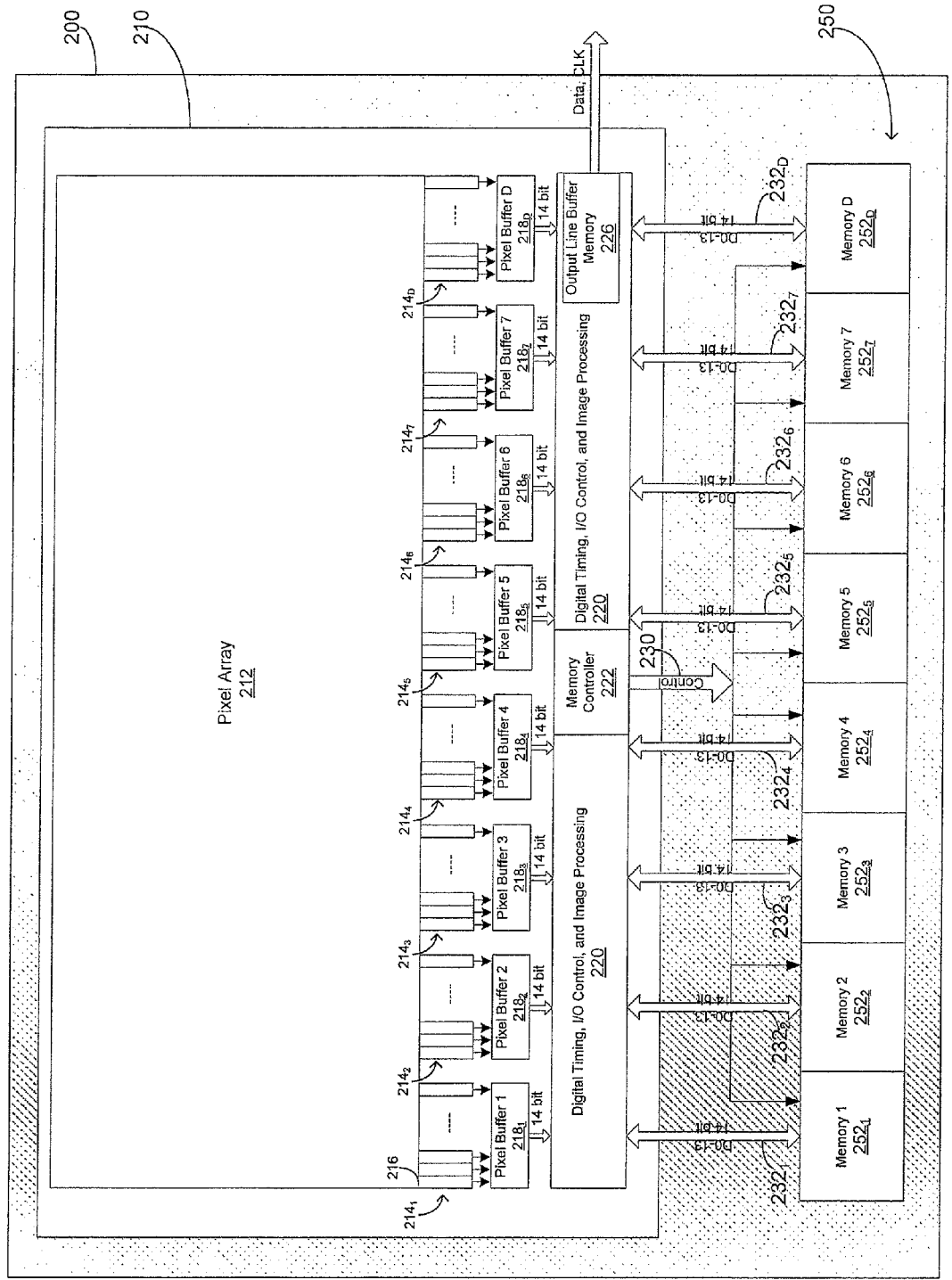
FIG. 7 illustrates in block diagram form an imager component comprising an imager integrated with high speed digital frame transfer and frame processing in accordance with an example embodiment disclosed herein.

FIG. 7 illustrates an imager component 200 comprising an imager with high speed digital frame transfer and frame processing in accordance with an example embodiment disclosed herein. The imager component 200 includes a high speed image sensor 210 and a frame memory 250 in the same physical package. Together, the image sensor 210 and the frame memory 250 comprise the imager having the high speed digital frame transfer and frame processing, which are hereinafter referred to collectively as the "DFT imager." The image sensor 210 and the frame memory 250 are connected by a control bus 230 and a plurality of bidirectional data buses $232_1$, $232_2$, $232_3$, $232_4$, $232_5$, $232_6$, $232_7$, ... $232_D$. The control bus 230, which is shared by all of the memory devices $252_1$, $252_2$, $252_3$, $252_4$, $252_5$, $252_6$, $252_7$, ... $252_D$ in the frame memory 250, is used by a memory controller 222 to transmit e.g., addressing, clock, column address strobe (CAS), row address strobe (ROW) and write enable (WE) signals to the frame memory 250.

In a desired embodiment, the data buses $232_1$, $232_2$, $232_3$, $232_4$, $232_5$, $232_6$, $232_7$, ... $232_D$ are 14-bit wide buses, but it should be appreciated that the embodiments described herein are not so limited. Keeping with the illustrated example, each bus $232_1$, $232_2$, $232_3$, $232_4$, $232_5$, $232_6$, $232_7$, ... $232_D$ passes fourteen data bits D0-D13 between its respective memory device $252_1$, $252_2$, $252_3$, $252_4$, $252_5$, $252_6$, $252_7$, ... $252_D$ and the image sensor 210. The illustrated frame memory 250 comprises a parallel array of multiple memory devices $252_1$, $252_2$, $252_3$, $252_4$, $252_5$, $252_6$, $252_7$, ... $252_D$ to provide high frame rate transfer between the image sensor pixel array 212 and the frame memory 250. In a desired embodiment, there are anywhere between 4 and 16 memory devices $252_1$, $252_2$, $252_3$, $252_4$, $252_5$, $252_6$, $252_7$, ... $252_D$ in the frame memory 250 (i.e., 4<=D<=16). That is, although eight memory devices $252_1$, $252_2$, $252_3$, $252_4$, $252_5$, $252_6$, $252_7$, ... $252_D$ are illustrated, it should be appreciated that the embodiments described herein are not so limited. In a desired embodiment, the frame memory 250 comprises dynamic random access memory (DRAM) or static random access memory (SRAM) or some other high speed digital memory.

The image sensor 210 comprises a high resolution pixel array 212, D groups of column analog circuits and parallel analog-to-digital converters $214_1$, $214_2$, $214_3$, $214_4$, $214_5$, $214_6$, $214_7$, ... $214_D$, D pixel line buffer memories $218_1$, $218_2$, $218_3$, $218_4$, $218_5$, $218_6$, $218_7$, ... $218_D$, the memory controller 222, digital control, timing and processing logic circuitry 220 (referred to herein as "digital processing logic" 220) and an output line buffer memory 226. The digital processing logic 220 is shown in two parts in FIG. 7, but it should be appreciated that the logic 220 may be one or more logic blocks and the illustrated embodiment should not be unnecessarily limited to a specified number and/or type of digital processing logic 220 as except where specifically noted herein. As noted above, D preferably falls within the range of 4 to 16.

In a desired embodiment, the pixel array 212 comprises over 12 million pixels organized as a 4,096×3,072 (N×M) array. It is desirable for the array 212 to comprise anywhere between 2,000 and 5,000 columns. Moreover, in addition to having fourteen column parallel analog-to-digital converters 216, each group of column analog circuits and parallel analog-to-digital converters $214_1$, $214_2$, $214_3$, $214_4$, $214_5$, $214_6$, $214_7$, ... $214_D$ comprises column sample and hold circuitry and differential amplifiers suitable for sampling, holding and creating difference signals for fourteen columns of pixel information. For convenience purposes only, the column analog circuits and parallel analog-to-digital converters $214_1$, $214_2$, $214_3$, $214_4$, $214_5$, $214_6$, $214_7$, ... $214_D$ are simply referred to herein as "ADCs". In a desired embodiment, the number of analog-to-digital converters 216 equals the number of columns (e.g., 4,096) in the pixel array 212. The analog processing circuitry within the column parallel ADCs $214_1$, $214_2$, $214_3$, $214_4$, $214_5$, $214_6$, $214_7$, ... $214_D$ allows for correlated double sampling using pixel reset Vrst and image signals Vsig, as is known in the art, and the digitizing of difference signals (Vrst−Vsig) based on the double sampling. It should be appreciated that fourteen columns per ADC group is just one example of how many columns (and corresponding number of ADCs, etc.) may be processed by the groups of ADCs $214_1$, $214_2$, $214_3$, $214_4$, $214_5$, $214_6$, $214_7$, ... $214_D$ in the illustrated embodiment.

In operation, the pixel array 212 is read out using the groups of column parallel ADCs $214_1$, $214_2$, $214_3$, $214_4$, $214_5$, $214_6$, $214_7$, ... $214_D$ such that each column analog-to-digital conversion circuit 216 simultaneously produces a digital output value as each row of the array 212 is being read out. It should be appreciated that the column parallel ADCs $214_1$, $214_2$, $214_3$, $214_4$, $214_5$, $214_6$, $214_7$, ... $214_D$ may be positioned on one side of the pixel array 212 (as is shown in FIG. 7) or two sides (as is generally shown as column circuits $614_1$, $614_2$ in FIG. 13) depending on the physical column width or circuit layout requirements.

It should be noted that column parallel analog-to-digital converters offer higher overall image readout speed with lower power requirements compared to pixel rate analog-to-digital converters. This becomes more apparent when high frame rate readout is required. For example, if the sensor design requires a pixel array size of 12 mega-pixels (Mpix) and the frame transfer rate is approximately 250 frames per second (fps), then the total number of pixel signal analog-to-digital conversions equates to 3 billion conversions per second. A single analog-to-digital converter is simply not plausible. Multiple analog-to-digital converters must be employed. If multiple conventional pixel rate analog-to-digital converters are used, e.g., 64 analog-to-digital converters in parallel, each converter would still need to operate at approximately 46.9 MHz, would draw considerable power and would also require large silicon die area. However, using 4096 column parallel analog-to-digital converters 216, split amongst the groups of ADCs $214_1$, $214_2$, $214_3$, $214_4$, $214_5$, $214_6$, $214_7$, ... $214_D$ and operating in parallel, only requires that each analog-to-digital converter 216 operates at 732 kHz. This conversion rate allows the column parallel analog-to-digital converters 216 to have a smaller, and low power, circuit architecture such as one found in a typical ramp analog-to-digital converter.

As is shown in FIG. 7, pixel line buffer memories $218_1$, $218_2$, $218_3$, $218_4$, $218_5$, $218_6$, $218_7$, ... $218_D$ are needed to store each row of pixels that is being read out since all of the analog-to-digital conversions from the N columns of the pixel array 212 occur simultaneously. The pixel data from a row will then be written sequentially to the frame memory 250. If the number of memory devices $252_1$, $252_2$, $252_3$, $252_4$, $252_5$, $252_6$, $252_7$, ... $252_D$ used in the system is D, then a total of D pixels may be written to the frame memory devices $252_1$, $252_2$, $252_3$, $252_4$, $252_5$, $252_6$, $252_7$, ... $252_D$ simultaneously. To achieve D pixel writes to the memory devices $252_1$, $252_2$, $252_3$, $252_4$, $252_5$, $252_6$, $252_7$, ... $252_D$ from the pixel line buffer memories $218_1$, $218_2$, $218_3$, $218_4$, $218_5$, $218_6$, $218_7$, ... $218_D$, the pixel line buffer memories $218_1$, $218_2$, $218_3$, $218_4$, $218_5$, $218_6$, $218_7$, ... $218_D$ must allow D pixels to be addressed simultaneously.

An integrated address sequencer 302 (shown in FIG. 8) addresses D pixel locations within the pixel line buffer memories $218_1$, $218_2$, $218_3$, $218_4$, $218_5$, $218_6$, $218_7$, ... $218_D$, and the D pixels are then written to the D memory devices $252_1$, $252_2$, $252_3$, $252_4$, $252_5$, $252_6$, $252_7$, ... $252_D$. The addresses used to address the pixel line buffer memories $218_1$, $218_2$, $218_3$, $218_4$, $218_5$, $218_6$, $218_7$, ... $218_D$ are increased to write the next set of D pixels. A total of NiD writes from the pixel line buffer memories $218_1$, $218_2$, $218_3$, $218_4$, $218_5$, $218_6$, $218_7$, $218_D$ to the frame memory devices $252_1$, $252_2$, $252_3$, $252_4$, $252_5$, $252_6$, $252_7$, ... $252_D$ must occur to transfer an entire row of pixel data to the frame memory 250. This sequence repeats for each row of the pixel array 212 until the entire image is transferred to the frame memory 250.

Figure 8:
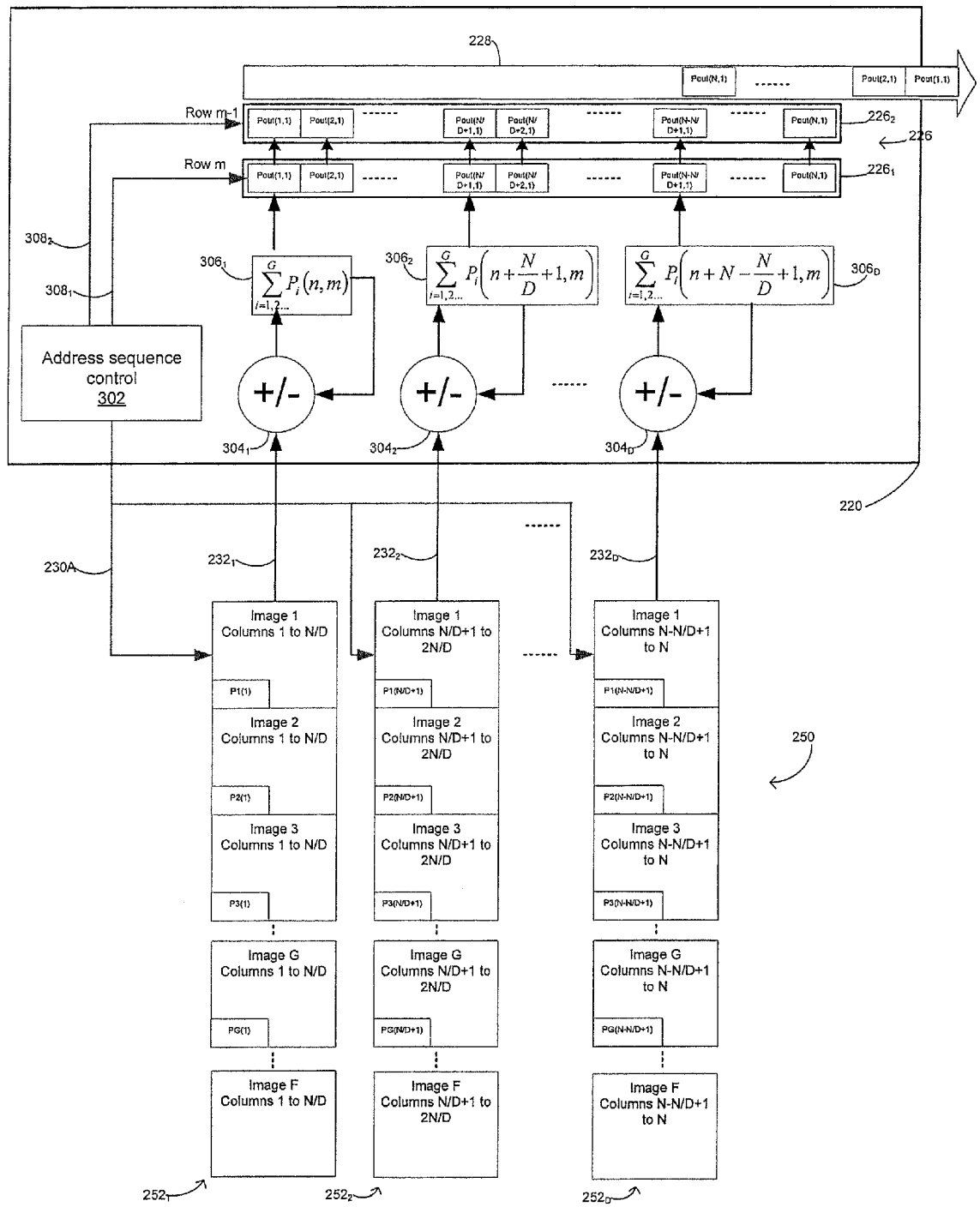
FIG. 8 illustrates in block diagram form an example processing circuit used in the imager of FIG. 7 in accordance with an embodiment disclosed herein.

The frame memory 250 consists of D memory devices $252_1$, $252_2$, $252_3$, $252_4$, $252_5$, $252_6$, $252_7$, ... $252_D$, each being connected to the control bus 230 for addressing and each having an independent data input/output bus $232_1$, $232_2$, $232_3$, $232_4$, $232_5$, $232_6$, $232_7$, ... $232_D$. The memory controller 222 is integrated into the image sensor 210 to provide automatic control of memory write and read operations for the various operating modes of the DFT imager (described below in more detail). Each memory device $252_1$, $252_2$, $252_3$, $252_4$, $252_5$, $252_6$, $252_7$, ... $252_D$ receives the same address thereby limiting the total number of address lines required from the image sensor 210 to the frame memory 250. As shown in FIG. 8, the frame memory devices $252_1$, $252_2$, $252_3$, $252_4$, $252_5$, $252_6$, $252_7$, ... $252_D$ have the capacity to hold up to F full frames of pixel data. In a desired embodiment, F is 16.

It should be appreciated that parallelization of the frame memory 250 reduces the requirement on the data bus $232_1$, $232_2$, $232_3$, $232_4$, $232_5$, $232_6$, $232_7$, ... $232_D$ bandwidth and is desirable to implement data rates above 1 giga-pixel/sec. The data bus rate for each memory device $252_1$, $252_2$, $252_3$, $252_4$, $252_5$, $252_6$, $252_7$, ... $252_D$ is equivalent to the pixel rate, R, divided by the number of memory devices D. For example, for a 3 giga-pixel readout rate and D=8 memory devices, the bus rate required would be 375 MHz, which is easily achieved using today's memory devices.

Referring now to FIG. 8, the digital processing logic 220 may optionally include circuits $306_1$, $306_2$, ... $306_D$ to perform averaging and circuits $304_1$, $304_2$, ... $304_D$ to perform addition and/or subtraction operations on pixel data across different frames stored in the frame memory 250. FIG. 8 illustrates example equations for the processing that may occur in circuits $306_1$, $306_2$, ... $306_D$, but it should be appreciated that the illustrated embodiment is not so limited. The image sensor 210 also comprises the address sequence controller 302, described above, which is connected to two output line buffer memories $226_1$, $226_2$ (collectively referred to herein as output line buffer memories 226) by address lines $308_1$, $308_2$. An output bus 228 connected to an output is also shown. A common address bus 230A (part of the control bus 230 shown in FIG. 7) is also illustrated.

As shown in FIG. 8, image data IMAGE 1, IMAGE 2, IMAGE 3, ..., IMAGE G, IMAGE F is stored across the memory devices $252_1$, $252_2$, ... $252_D$ in the frame memory 250. The data is split amongst the devices $252_1$, $252_2$, ... $252_D$ as follows. The first device $252_1$ has row pixel data P1(1), P2(1), P3(1), PG(1) associated with columns 1 to N/D of each image IMAGE 1, IMAGE 2, IMAGE 3, ..., IMAGE G. It should be appreciated that, for image clarity purposes, only one pixel location e.g., P1(1) is shown, but that there would be pixel data corresponding to each row in the associated columns stored in device $252_1$ (i.e., up to P1(N/D)). Likewise, the second device $252_2$ has row pixel data P1(N/D+1), P2(N/D+1), P3(N/D+1), PG(N/D+1) associated with columns N/D+1 to 2N/D of each image IMAGE 1, IMAGE 2, IMAGE 3, ..., IMAGE G. The Dth device $252_D$ has row pixel data P1(N-N/D+1), P2(N-N/D+1), P3(N-N/D+1), PG(N-N/D+1) associated with columns N-N/D+1 to N of each image IMAGE 1, IMAGE 2, IMAGE 3, ..., IMAGE G. The organization of the data in the frame memory devices $252_1$, $252_2$, ... $252_D$ is discussed below in more detail with respect to FIG. 9.

In FIG. 8, "n" is the column address within the pixel array 212, "m" is the row address within the pixel array 212, "i" is the current image frame number, and "G" is the number of frames to process. The address sequence controller 302 optionally generates address sequence image summing as follows: A1(n,m), A2(n,m), ... A4(n,m), A1(n+1,m), A2(n+1,m), ..., where A(n,m) is the memory address corresponding to a pixel at address n,m in an image "I" of images IMAGE 1, IMAGE 2, IMAGE 3, ..., IMAGE G, IMAGE F. In operation, image data IMAGE 1, IMAGE 2, IMAGE 3, ..., IMAGE G, IMAGE F is read from frame memory 250 through the image sensor 210 and pixel data "Pi" is processed before being sent through the output line buffer memory 226 and output port via bus 228. The processing circuits $304_1$, $304_2$, ... $304_D$, $306_1$, $306_2$, ... $306_D$ allow frame averaging to improve signal-to-noise ratios, dynamic range and frame subtraction for dark offset image calibration.

The two output line buffer memory devices $226_1$, $226_2$ allow processed pixel data Pout(1,1), Pout(2,1), ..., Pout(N/D+1,1), Pout(N/D+2,1), ..., Pout(N-N/D+1,1), ..., Pout (N,1) to be read out in sequential column order for each row m, m-1, etc. Since D pixels are read from the frame memory 250 and processed simultaneously, they must be temporarily stored since their column addresses are not sequential. Once a processed row is stored in the first output line buffer memory $226_1$, all of the data is transferred to the second output line buffer memory devices $226_2$, which is then read-out in column sequential order through the pixel output data bus 228. As shown in FIG. 8, current row m is stored in the output line buffer memory devices $226_1$, while the prior row m-1 is stored in the second output line buffer memory device $226_2$, before being output using the output bus 228.

The DFT imager can operate in a single frame mode or in several multiple frame modes. The single frame operational mode of the DFT imager is now described with reference to FIG. 9, which shows the manner in which the frame memory 250 is organized in more detail. The N columns of each image IMAGE 1, IMAGE 2, ..., IMAGE F are divided equally between memory devices $252_1$, $252_2$, $252_3$, $252_4$, $252_5$, $252_6$, ... $252_D$ to provide maximum bandwidth during burst write operations. The image sensor 210 uses a rolling shutter to output one row of pixel data at a time. It should be appreciated that because a rolling shutter operation is used, pixel reset and photo signals will be obtained for each row, which then undergo correlated double sampling to arrive at image pixel data substantially free of kT/C noise. Dividing each row equally between the D memory devices $252_1$, $252_2$, $252_3$, $252_4$, $252_5$, $252_6$, $252_7$, ... $252_D$ and writing to the devices $252_1$, $252_2$, $252_3$, $252_4$, $252_5$, $252_6$, $252_7$, ... $252_D$ in parallel maximizes utilization of the memory input/output ports. The image pixel data is written sequentially into the memory devices $252_1$, $252_2$, $252_3$, $252_4$, $252_5$, $252_6$, $252_7$, ... $252_D$ to allow slower and simplified memory address sequencing.

Figure 9:
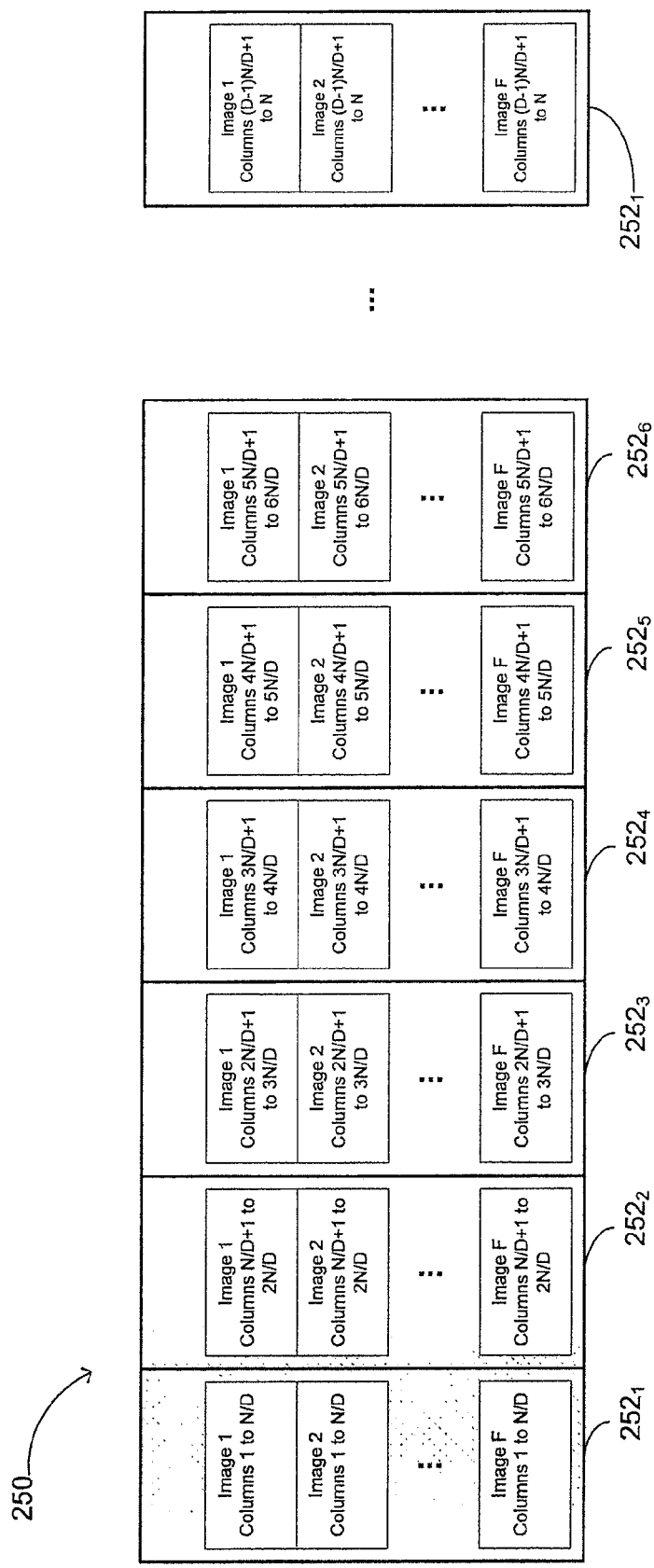
FIG. 9 illustrates an example memory organization of the frame memory used in the imager component of FIG. 7 in accordance with an embodiment disclosed herein.

The memory devices $252_1$, $252_2$, $252_3$, $252_4$, $252_5$, $252_6$, $252_7$, ... $252_D$ are large enough to store multiple frames of image data. FIG. 9 illustrates F frames. As briefly discussed above, each memory device stores row pixel data associated with predetermined columns within the images IMAGE 1, IMAGE 2, . . . , IMAGE F. Accordingly, the first device $252_1$ stores row data associated with columns 1 to N/D, the second device $252_2$ stores row data associated with columns N/D+1 to 2N/D, the third device $252_3$ stores row data associated with columns 2N/D+1 to 3N/D, the fourth device $252_4$ stores row data associated with columns 3N/D+1 to 4N/D, the fifth device $252_5$ stores row data associated with columns 4N/D+1 to 5N/D, and so on with the Dth device $252_D$ storing row data associated with columns (D−1)N/D+1 to N.

When a rolling shutter image capture occurs, each analog row is read out of the pixel array 212 using the column parallel ADCs 216 and is stored in the pixel line buffer memories $218_1$, $218_2$, $218_3$, $218_4$, $218_5$, $218_6$, $218_7$, . . . $218_D$. The pixel data is then written D pixels at a time in parallel, one pixel to each of the memory devices $252_1$, $252_2$, $252_3$, $252_4$, $252_5$, $252_6$, $252_7$, . . . $252_D$. This limits the data input/output lines required between the image sensor 210 and the frame memory 250 and allows for a common memory address bus 230A to be used between the sensor 210 and frame memory 250. A complete image row is written from the pixel line buffer memories $218_1$, $218_2$, $218_3$, $218_4$, $218_5$, $218_6$, $218_7$, . . . $218_D$ into the memory devices $252_1$, $252_2$, $252_3$, $252_4$, $252_5$, $252_6$, $252_7$, . . . $252_D$ before readout of the next row begins. Capture is complete when all image rows have been written to the memory devices $252_1$, $252_2$, $252_3$, $252_4$, $252_5$, $252_6$, $252_7$, . . . $252_D$.

Figure 10:
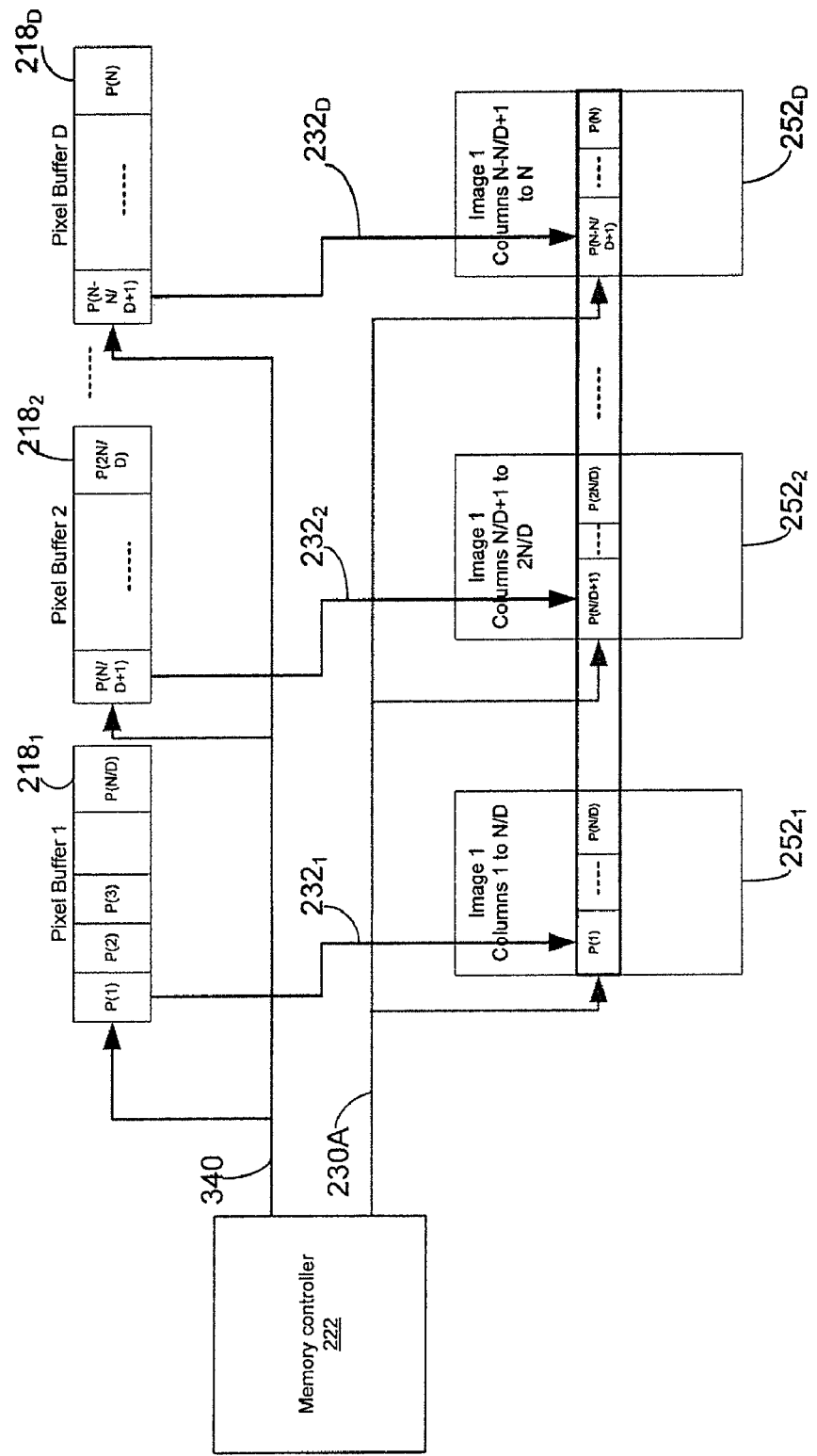
FIG. 10 illustrates example circuitry used during image capture by the imager component of FIG. 7 in accordance with an embodiment disclosed herein.

Addressing for the memory writes is directed by the memory controller 222, which automatically steps the frame memory and pixel line buffer addresses during image frame transfer. FIG. 10 illustrates the common address bus architecture for the frame memory devices $252_1$, $252_2$, . . . , $252_D$ and the pixel line buffer memories $218_1$, $218_2$, . . . $218_D$. FIG. 10 also illustrates data P(1), P(2), P(3), . . . , P(N/D), P(N/D+1), . . . , P(2N/D), . . . , P(N-N/D+1), . . . , P(N) from D pixels being written simultaneously from the pixel line buffer memories $218_1$, $218_2$, . . . , $218_D$ to the memory devices $252_1$, $252_2$, . . . , $252_D$.

As shown in FIG. 10, there is a common address bus 340 between the controller 222 and the pixel line buffer memories $218_1$, $218_2$, . . . $218_D$. There is also a common address bus 230A (art of the control bus 230) between the controller 222 and the memory devices $252_1$, $252_2$, . . . $252_D$. The pixel data from the pixel line buffer memories $218_1$, $218_2$, $218_3$, $218_4$, $218_5$, $218_6$, $218_7$, . . . $218_D$ is sent to the memory devices $252_1$, $252_2$, $252_3$, $252_4$, $252_5$, $252_6$, $252_7$, . . . $252_D$ over respective data buses $232_1$, $232_2$, . . . $232_D$.

Referring again to FIG. 8, once the pixel signals have been captured (using rolling shutter and correlated double sampling operations) and stored in the frame memory 250 as pixel data, readout from the DFT imager may occur. The stored pixel data corresponding to a complete row of image data are read in parallel from the memory devices $252_1$, $252_2$, . . . , $252_D$ into the first pixel output line buffer memory $226_1$. The signals are written to the appropriate column address in the output line buffer memory $226_1$. Addressing of the memory devices $252_1$, $252_2$, $252_3$, $252_4$, $252_5$, $252_6$, $252_7$, . . . $252_D$ is sequential and is directed by the memory controller 222. When all columns of an image row have been written to the output line buffer memory $226_1$, the row is transferred to the second output line buffer memory $226_2$ and output (via output bus 228) in column-sequential order at an appropriate speed for the receiving device. As previously mentioned, when a row "m-1" has been written to the second output line buffer memory $226_2$, readout of another row "m" can begin. Rows are read out sequentially. The sequential output order helps the DFT imager interface resemble a typical rolling shutter imager output. Readout is complete when the entire frame has been output.

As indicated previously, several multiple frame operational modes are available on the DFT imager. The modes (as well as the single frame mode) are user selectable via a user interface to the image sensor 210 (not shown) and include an averaging/summing mode, dark frame subtraction mode, high dynamic range (HDR) mode, and video mode. All frame captures for the multiple frame modes follow the single frame mode capture procedure described above. Any required processing is performed on rows during readout, after the stored pixel data is read from the frame memory devices $252_1$, $252_2$, $252_3$, $252_4$, $252_5$, $252_6$, $252_7$, . . . $252_D$ and before being stored in the output line buffer memories $226_1$, $226_2$ and output from the component 200. As shown in FIG. 7 and in more detail in FIG. 8, digital processing circuitry 220 is located on the image sensor 210, which can be clocked at a slower rate as compared to the clock rate supplied during image capture.

The averaging/summing and high dynamic range (HDR) modes reduce the effective shutter speed as multiple sequential snapshots are needed to produce a single image. To capture G images, the effective shutter speed is:

$$t_{total} = t_{exp1} + t_{exp2} + \ldots + t_{expG}, \text{ where:} \quad (1)$$

$$t_{expi} = \max(\text{frame "i" exposure time, frame "i" pixel array readout time}) \quad (2)$$

It should be appreciated that the high speed memory storage used in the disclosed embodiments allows multiple frames to be captured in sequence without requiring a readout interface causing delay between image exposures. In addition, the high speed rolling shutter readout architecture allows for very short pixel array readout times. This allows the effective shutter speed to be very fast, making the following modes appropriate for scenes that do not possess high speed motion.

The first multiple frame mode is referred to herein as the averaging/summing mode. In the averaging mode, up to F frames may be averaged to decrease temporal noise. In the summing mode, up to F frames may be summed to increase dynamic range without special high dynamic range processing. The summing of G frames increases dynamic range by a factor of the square-root of G. The G frames are captured sequentially and stored into the memory devices $252_1$, $252_2$, $252_3$, $252_4$, $252_5$, $252_6$, $252_7$, . . . $252_D$ following the normal capture procedure.

Image readout during the averaging/summing mode was described above with reference to FIG. 8. To sum G images or image frames, the pixel data from each frame corresponding to the same pixel location in the pixel array 212 is read from the frame memory 250 and then summed together using circuits $306_1$, $306_2$, . . . $306_D$, and/or circuits $304_1$, $304_2$, . . . $304_D$. The summed pixel data is written to the proper column address in the output line buffer memory $226_1$. The value Pout(m,n) of the output pixel corresponding to sensor array location m,n is determined by the following equation:

$$Pout(m,n) = P\text{frame}1(m,n) + P\text{frame}2(m,n) + \ldots + P\text{frame}G(m,n) \quad (3)$$

The output pixel data Pout(m,n) for the averaging mode is:

$$Pout(m,n) = 1/G^*[P\text{frame}1(m,n) + P\text{frame}2(m,n) + \ldots + P\text{frame}G(m,n)] \quad (4)$$

Data access occurs in parallel for each memory device $252_1$, $252_2$, $252_3$, $252_4$, $252_5$, $252_6$, $252_7$, . . . $252_D$, which allows a single address bus to be used. Multiple processing circuits 220 may be employed to decrease clock rate requirements when processing D pixel data simultaneously. Once processing is complete, the data from the D pixels is stored in the first pixel output line buffer memory $226_1$ according to their column addresses. As described above for the single frame mode, once an entire image row is written to the first pixel output line buffer memory $226_1$, it is transferred to the second pixel output line buffer memory $226_2$ and output in column-sequential order over the output bus 228. The image rows are read, processed, and output in sequential order, It should be noted, however, that while pixel data is stored in the output line buffer memories $226_1$, $226_2$ and output in the same order as in single frame mode, the memory devices $252_1$, $252_2$, $252_3$, $252_4$, $252_5$, $252_6$, $252_7$, ... $252_D$ are not addressed sequentially. For example, the memory addressing sequence for the first memory device $252_1$, for the mth row of image data, will cause the data to be read out as follows:

Pframe1(m, 1), Pframe2(m, 1), . . . , PframeG(m, 1), Pframe1(m, 2), Pframe2(m, 2), . . . , PframeG(m, 2), . . . , Pframe1(m, N/D), Pframe2(m, N/D), . . . , PframeG(m, N/D)

In single frame readout mode, only one frame is read out of the imager device at a time so memory addressing is sequential. Using non-sequential addressing when performing multiple-frame processing reduces the buffer memory needed for sequential output.

Another multiple frame operational mode is referred to herein as the dark-frame subtraction mode. In the dark-frame subtraction mode, a dark frame is captured immediately following normal image capture and storage of a single frame snapshot. The two frames are captured sequentially and both follow the normal capture procedure described above for a single frame capture. The subtraction can remove hot-pixels from the snapshot frame, reducing fixed pattern noise in the image. In one embodiment, the dark frame may be captured using a low cost mechanical shutter that does not require high speed or precise operation.

The readout operation for the dark-frame subtraction mode is the same as for the summing mode, except that only two frames are used, and summing is replaced with subtraction. The two frames are combined at readout time by subtracting the dark frame pixel signal at array position (m,n) from the pixel signal at position (m,n) in the original snapshot. Similar to the summing mode operation, the data access and subtraction occurs in parallel for each memory device $252_1$, $252_2$, $252_3$, $252_4$, $252_5$, $252_6$, $252_7$, ... $252_D$. Pixel data making up an entire image row is processed, written to the first output line buffer memory $226_1$, and transferred to the second output line buffer memory $226_2$ before processing of the next row begins. Pixel data is output from the second output line buffer memory $226_2$ in sequential column order. Completed rows are output in sequential row order.

Figure 11:
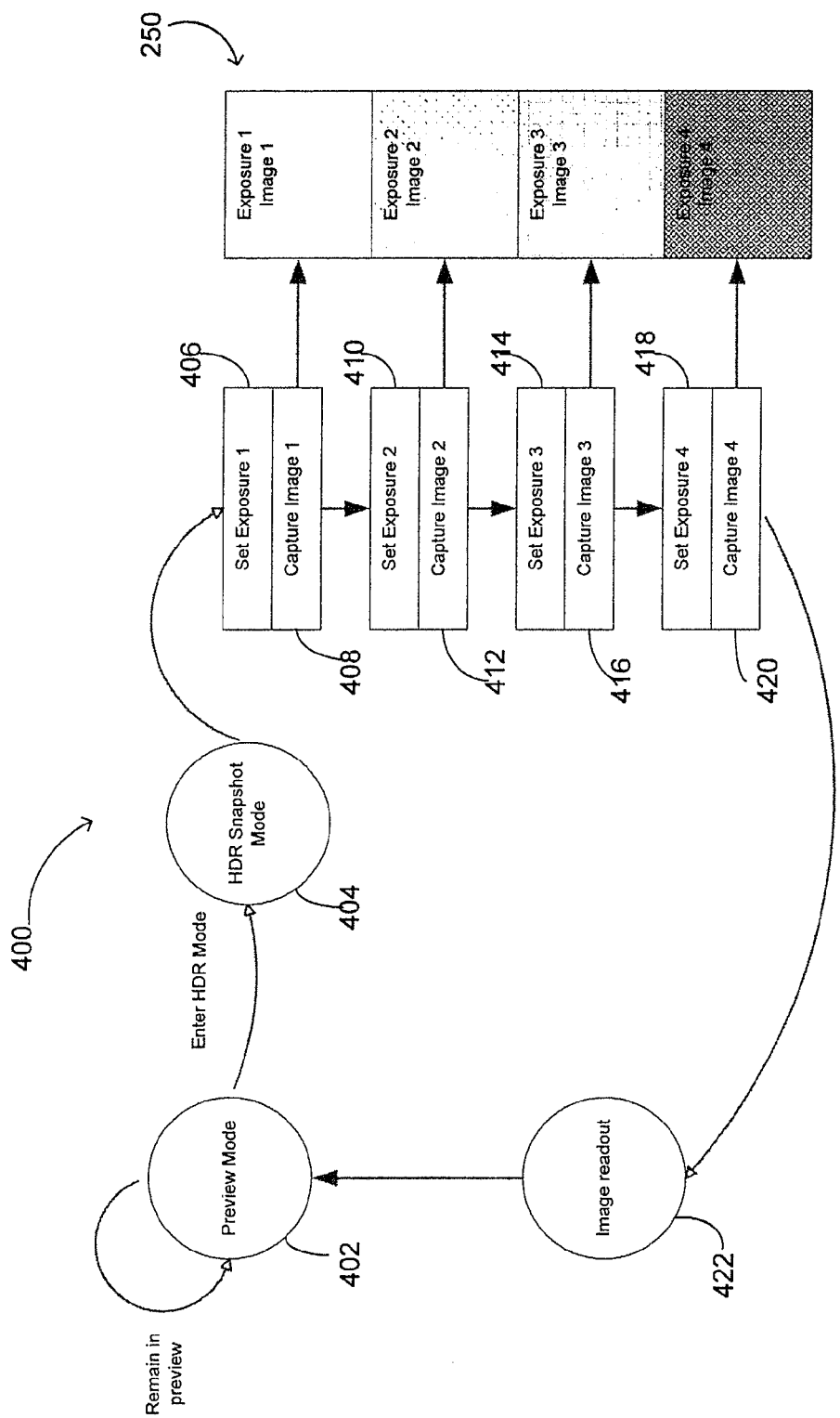
FIG. 11 illustrates a process of performing a high dynamic range operational mode in the imager of FIG. 7 in accordance with an embodiment disclosed herein.

The processing 400 of the high dynamic range (HDR) mode is now described with reference to FIG. 11. The high dynamic range mode combines an integrated exposure state machine/sequencer with the ability to quickly capture and store multiple images, which allows the construction of a high dynamic range image from the multiple images. FIG. 11 illustrates the use of four images IMAGE 1, IMAGE 2, IMAGE 3, IMAGE 4, but it should be appreciated that any number of images e.g., G images, could be used. Accordingly, the following description is made with reference to G images, whereby G is 4 in FIG. 11.

The process 400 begins with a preview mode (step 402) and remains in the preview mode until the user enters the high dynamic range mode (step 404). Unlike film cameras, CMOS imagers can also be used to collect preview images. If the preview images are presented in an electronic viewfinder, the expensive elements of the optical viewfinder system can be eliminated. These elements include the electronically actuated mirror, ground glass focusing screen and pentaprism. Once the mirror and mechanical shutter are removed, the imager can also be used to perform exposure metering and focus adjustment. The ancillary mechanisms that are generally provided in digital single-lens reflex cameras to accomplish these functions can also be eliminated.

To use G images, all G frames are captured and stored before any readout occurs. This will limit the amount of motion between frames. All G frames must be stored in the frame memory 250, so up to F full image frames may be used. As shown in FIG. 11, the G images are captured using G different exposures. An integrated exposure sequencer within the image sensor 210 allows the programming of the exposure settings for the necessary snapshots without requiring external exposure control.

At step 406, a first exposure setting is set and used to capture a first image IMAGE 1 (step 408). The first image IMAGE 1 is stored in the frame memory 250. At step 410, a second exposure setting is set and used to capture a second image IMAGE 2 (step 412), which is stored in another location in the frame memory 250. At step 414, a third exposure setting is set and used to capture a third image IMAGE 3 (step 416), which is stored in another location in the frame memory 250. At step 418, a fourth exposure setting is set and used to capture a fourth image IMAGE 4 (step 420), which is stored in another location in the frame memory 250.

Exposure can be adjusted by increasing/decreasing the shutter speed. In one example, the first exposure setting uses an equivalent shutter speed of 25 ms, the second exposure setting uses an equivalent shutter speed of 5 ms, the third exposure setting uses an equivalent shutter speed of 1 ms, and the fourth exposure setting uses an equivalent shutter speed of 0.2 ms. Pixel array readout time is approximately 4 ms. After all G images are captured and stored in the frame memory 250, the images are read out sequentially following the single-frame mode readout procedure (step 422). The separate image frames at different exposures may be read out and processed by an external image processor if desired.

An electronic viewfinder camera can also be used to collect digital video. For digital video, image resolution is reduced by cropping and averaging, which enables the videographer to capitalize on an investment in interchangeable SLR lenses. These new kinds of DSLR products are achievable due to the DFT imager disclosed herein. The DFT imager could also be included in a compact digital camera modeled on an APS-format film camera and provides the benefits of large pixel size (indoor photography in natural light and low noise) in a small package.

The DFT imager described herein may also implement several video modes due to its high speed rolling shutter architecture. These modes include, but are not limited to, 480 p (640×480 @ 60 fps), 720 p (1280×720 @ 60 fps), and 1080 p (1920×1080 @ 60 fps). The high speed readout and absence of a slow mechanical shutter allows the DFT imager disclosed herein to supply required high speed video output rates.

In any of the video modes, binning is used to format the pixel array 212 to the correct video resolution. Binning can be performed on both the analog and digital pixel data. After digital conversion and binning, the pixel data is written to one of the pixel line buffer memories $218_1$, $218_2$, $218_3$, $218_4$, $218_5$, $218_6$, $218_7$, ... $218_D$. The pixel data is output from the pixel line buffer memories $218_1$, $218_2$, $218_3$, $218_4$, $218_5$, $218_6$, $218_7$, ... $218_D$ in sequential column order. It should be noted that in the video modes, the frame memory 250 is unused to conserve power since they are not required to buffer the video data. The image sensor' 210 output port and the rolling shutter readout time is designed to accommodate the required video output rate.

Figure 12:
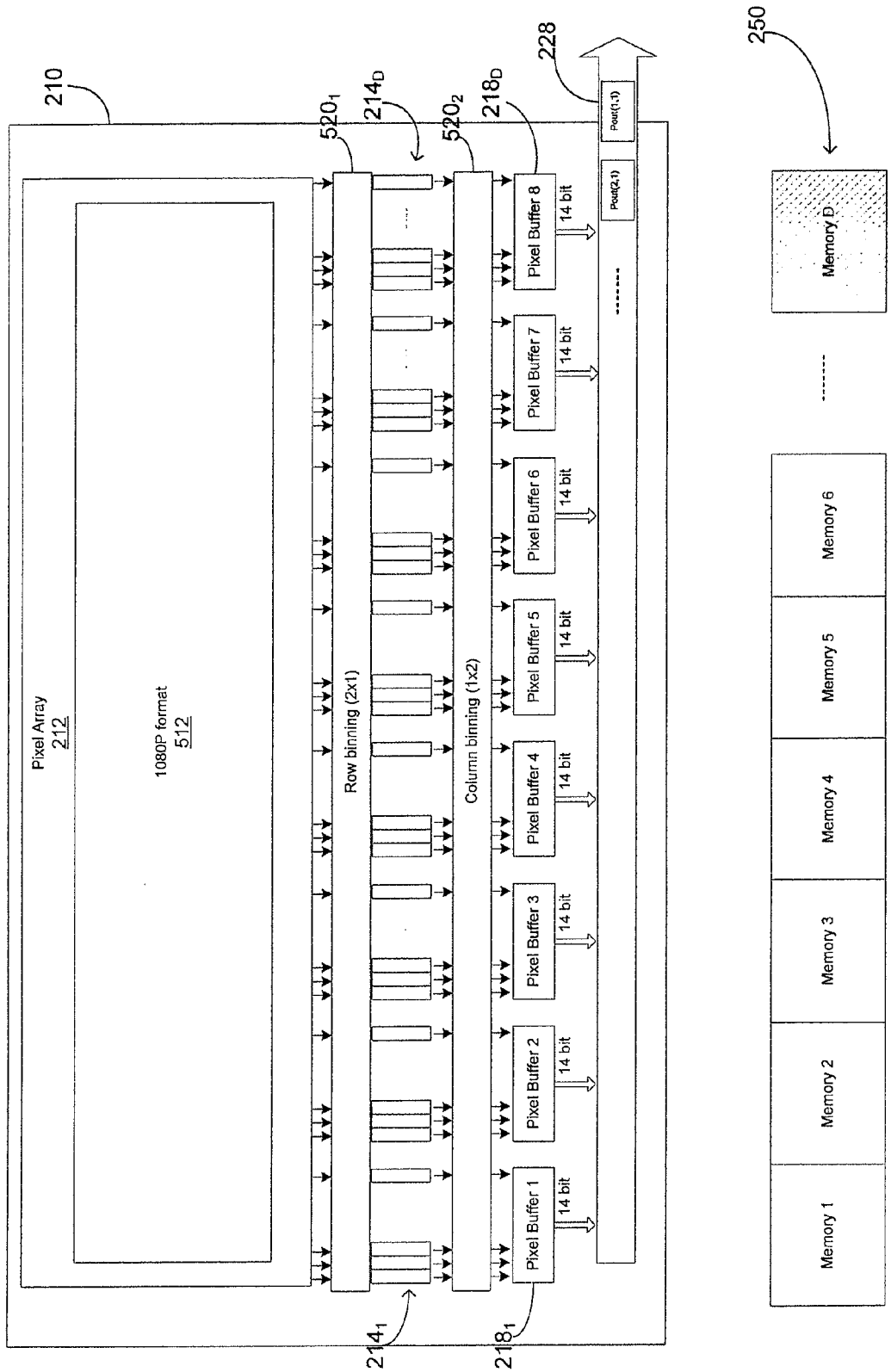
FIG. 12 illustrates the imager of FIG. 7 configured for a high definition video mode in accordance with an embodiment disclosed herein.

FIG. 12 illustrates an example of the 1080 p format for high definition television (HDTV) video mode using a 12 mega-pixel pixel array 212 and 2×2 binning. As shown in FIG. 12, the array 212 is configured through software (based on a user input) for the 1080 p format to achieve a 1080 p formatted array 512. A row binning circuit $520_1$ is connected between the array 512 and the ADCs $214_1, \ldots, 214_D$. A column binning circuit $520_2$ is connected between the ADCs $214_1, \ldots, 214_D$ and the pixel line buffer memories $218_1, 218_2, 218_3, 218_4, 218_5, 218_6, 218_7, \ldots 218_D$. The binning circuits $520_1, 520_2$ are part of the digital processing logic 220 illustrated in FIG. 7. Through software configuration, the binned pixel data Pout(1,1), Pout(2,1) is output over the output bus 228.

Figure 13:
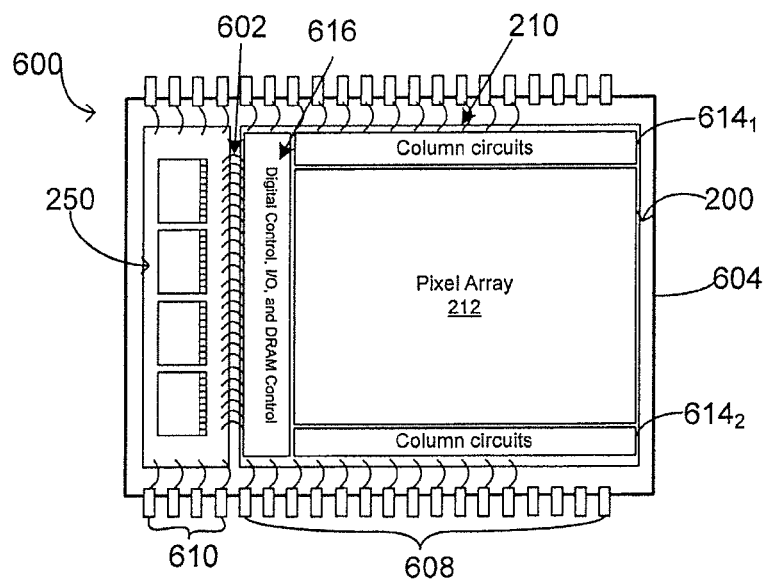
FIGS. 13 and 14 illustrate example packaging for the imager component constructed in accordance with an embodiment disclosed herein.

FIG. 13 illustrates the imager component 200 having the image sensor die 210 and frame memory 250 die housed in the same package 600. The frame memory 250 die may be assembled on a modular printed circuit board (PCB) that is placed in the package 600 adjacent to the image sensor die 210. High density bond wire connections 602 may be placed along the sides of the image sensor 210 die to connect the memory 250 with the sensor 210. It should be appreciated that a simple bond wire assembly may be used to connect the memory 250 and sensor 210. In the illustrated embodiment, the analog-to-digital converters are split up and placed on opposite sides of the pixel array 212 in the column circuits $614_1, 614_2$. Digital control, I/O and memory control circuitry 616 of the image sensor 210 is also shown. The package 600 also includes a cavity 604 for housing the circuitry, bond wires, etc., pins 608 for interfacing with the image sensor 210 and providing ground and power to the sensor 210, and pins 610 for interfacing with the frame memory 250 and providing ground and power to the frame memory 250.

Figure 14:
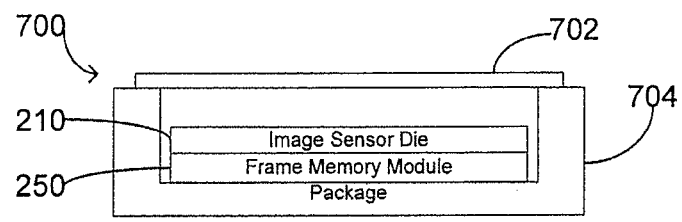

Because the interface between the frame memory 250 and the image sensor 210 is internal to the package 600, only a small number of digital I/O lines are required to interface the imager to an external camera system 700 (FIG. 15) thereby reducing camera design complexity. An example configuration would have a single pixel data output bus 228, 14 bits wide, plus line valid, frame valid, pixel clock, control, and power/ground signals as external interface pins 608 from the package 600. Moreover, it should be appreciated that additional configurations may include: (1) placing the memory devices of the frame memory 250 on opposite sides of the image sensor 210 die to minimize high speed digital routing; and (2) placing the memory devices of the frame memory 250 under the image sensor 210 with through-wafer-interconnect bonding connections or similar technology (as is shown in FIG. 14). As shown in FIG. 14, the package 700 includes a cavity 704 whereby the image sensor 210 die is stacked over the frame memory 250. A cover glass 702 completes the package 700.

Separating the frame memory 250 from the image sensor 210 die, however, may allow several advantages over die stacking such as e.g.,: (1) achieving thermal isolation of the image sensor 210 and frame memory 250 more easily and thereby improve performance of the DFT imager; (2) allowing the frame memory 250 module to be manufactured and tested separately from the image sensor 210 die, thereby potentially increasing overall production yield; and (3) assembling and packaging of the memory 250 and image sensor 210 as separate components may allow the use of existing and low cost technology such as common wire bonding.

Figure 15:
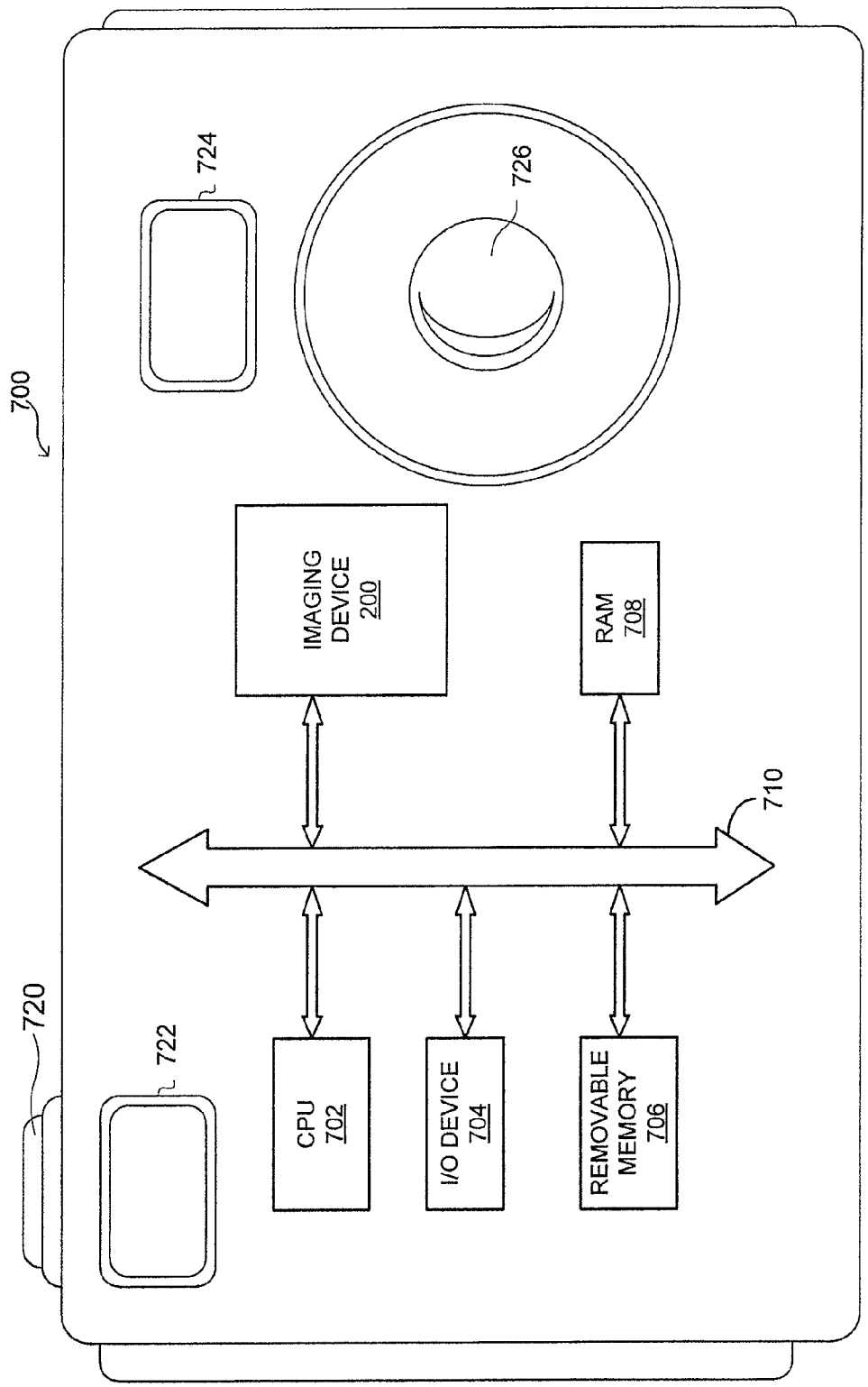
FIG. 15 is a block diagram of a processing system utilizing the imager component illustrated in FIG. 7.

FIG. 15 shows a camera system 700, which includes an imaging device 200 constructed in accordance with an embodiment described herein. The system 700 is an example of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image acquisition or processing system.

System 700, for example a camera system, generally comprises a central processing unit (CPU) 702, such as a microprocessor, that communicates with an input/output (I/O) device 704 over a bus 710. The CPU 702 and I/O device 704 may input and control the user selectable single frame and multiple frame operating modes described above. The CPU 702 may also control the rolling shutter operation used to capture images in the imaging device 200, or another processor or controller may be used within or external to the device 200 to control the rolling shutter. The imaging device 200 also communicates with the CPU 702 over the bus 710. The system 700 also includes random access memory (RAM) 708, and can include removable memory 706, such as flash memory, which also communicate with the CPU 702 over the bus 710. The imaging device 200 may be combined with a processor, such as a CPU, digital signal processor, or microprocessor, with or without memory storage on a single integrated circuit or on a different chip than the processor. In operation, an image is received through lens 726 when the shutter release button 720 is depressed. The illustrated camera system 700 also includes a view finder 722 and a flash 724.

As is apparent from the above description, the disclosed embodiments provide: (1) a rolling shutter, digital frame transfer CMOS imager referred to herein as the DFT imager; (2) an imager with integrated frame memories in the same package to allow high speed image frame transfer; (3) an image sensor with an integrated memory controller for controlling the frame transfer of the image data to parallel frame memories; (4) an image sensor with pixel processing circuits to perform image frame averaging, summing, and/or subtraction during readout from the frame memory to an external camera system; (5) an imager with an integrated exposure control sequencer to allow a series of images to be captured such that each image has a different exposure time (allowing the capturing of high dynamic range scene content); and (6) an imager with high resolution still capture, high definition video, and high dynamic range modes.

It should be appreciated that embodiments disclosed herein may also comprise a method of fabricating the imager component 200 illustrated in FIG. 7. The method could comprise providing an image sensor 200 having a pixel array 212 organized into rows and columns, the array 212 being configured to capture an image. The sensor 210 could further comprise an output bus 228 configured to output digital data corresponding to the captured image. The method could also include providing a frame memory 250 connected to the image sensor 210 via at least one bus 230. The image sensor 210 could be provided with an integrated memory controller 222 configured to control data transfers between the frame memory 250 and the image sensor 210.

The above description and drawings illustrate various embodiments It should be appreciated that modifications, though presently unforeseeable, of these embodiments that comes within the scope of the following claims can be made.

What is claimed as new and desired to be protected by Letters Patent of the United States is:

1. An imager component comprising:
an image sensor having a pixel array organized into rows and columns, the array configured to capture an image, the sensor further comprising an output bus configured to output digital data corresponding to the captured image; and a frame memory connected to the image sensor via at least one bus, said image sensor comprising a memory controller configured to control data transfers between the frame memory and the image sensor;

wherein the image sensor further comprises:

column parallel analog readout circuitry connected to the columns, the column parallel analog readout circuitry converting signals associated with the captured image into the digital data; and a plurality of pixel line buffer memories, each line buffer memory being connected to and associated with a group of columns and storing a respective portion of the digital data associated with the respective group of columns, the line buffer memories configured to store the digital data from the column parallel analog readout circuitry during the readout operation, wherein the controller causes all of the digital data to be sequentially stored in the frame memory.

2. The imager component of claim 1, wherein the image sensor is operated using a rolling shutter.

3. The imager component of claim 1, wherein the frame memory comprises a plurality of memory devices, each device being configured to store a respective portion of the digital data input from the line buffer memories and wherein a number of frame memory devices and line buffer memories are the same.

4. The imager component of claim 1, wherein the column parallel analog readout circuitry comprises at least one analog-to-digital conversion circuit per column in the array, each analog-to-digital conversion circuit being operated simultaneously during a readout operation.

5. An imager component comprising:

an image sensor having a pixel array organized into rows and columns, the array configured to capture an image, the sensor further comprising an output bus configured to output digital data corresponding to the captured image; and a frame memory connected to the image sensor via at least one bus, said image sensor comprising a memory controller configured to control data transfers between the frame memory and the image sensor;

wherein the image sensor further comprises:

column parallel analog readout circuitry connected to the columns, the column parallel analog readout circuitry converting signals associated with the captured image into the digital data;

a plurality of pixel line buffer memories, each line buffer memory being connected to and associated with a group of columns and storing a respective portion of the digital data associated with the respective group of columns, the line buffer memories configured to store the digital data from the column parallel analog readout circuitry during the readout operation; and digital processing circuitry connected between the pixel line buffer memories and the frame memory for processing the digital data according to an operating mode of the image sensor.

6. The imager component of claim 5, wherein the digital processing circuitry comprises:

circuitry for performing one of averaging, summation or subtraction on digital data input from the frame memory; and pixel output line buffer memory for sequentially storing the processed digital data before the data is output over the output bus.

7. The imager component of claim 5, wherein the digital processing circuitry comprises:

a plurality of circuits for performing one of averaging, summation or subtraction on digital data input from the frame memory, the number of circuits matching the number of groups of columns;

a first pixel output line buffer memory for sequentially storing the processed digital data of a first row; and a second pixel output line buffer memory for sequentially storing the processed digital data of a previous row before the data of the previous row is output over the output bus.

8. An imaging device comprising:

a pixel array organized into rows and columns, the array configured to capture an image;

column parallel analog readout circuitry connected to the columns, the column parallel analog readout circuitry converting signals associated with the captured image into digital data;

a plurality of pixel line buffer memories each being connected to and associated with a group of columns and storing a respective portion of the digital data associated with the respective group of columns;

a plurality of frame memory devices connected to the plurality of pixel line buffer memories via a plurality of data buses;

a memory controller configured to control data transfers between the frame memory devices and the plurality of pixel line buffer memories; and an output bus configured to output digital data corresponding to the captured image.

9. The imaging device of claim 8, further comprising digital processing circuitry connected between the pixel line buffer memories and the frame memory devices, the digital processing circuitry for processing the digital data according to an operating mode.

10. The imaging device of claim 9, wherein multiple images are captured and stored in the frame memory devices as digital frames and wherein the digital processing circuitry processes a plurality of the stored digital frames digital data in accordance with a multiple frame mode of operation.

11. The imaging device of claim 9, wherein multiple images are captured and stored in the frame memory devices as digital frames and wherein the digital processing circuitry processes a plurality of the stored digital frames digital data in accordance with an averaging mode of operation wherein at least two of the stored digital frames are averaged to form averaged image data before being output.

12. The imaging device of claim 9, wherein multiple images are captured and stored in the frame memory devices as digital frames and wherein the digital processing circuitry processes a plurality of the stored digital frames digital data in accordance with a summing mode of operation wherein at least two of the stored digital frames are summed together to form summed image data before being output.

13. The imaging device of claim 9, wherein multiple images are captured and stored in the frame memory devices as digital frames and wherein the digital processing circuitry processes a plurality of the stored digital frames digital data in accordance with a dark frame subtraction mode wherein a dark image frame from the stored digital frames is subtracted from another of the stored digital frames to form subtracted image data.

14. The imaging device of claim 9, wherein multiple images are captured and stored in the frame memory devices as digital frames and wherein the digital processing circuitry processes a plurality of the stored digital frames digital data in accordance with a high dynamic range mode wherein a plurality of stored digital frames are combined to form a high dynamic range image, each stored digital frame corresponding to a different image exposure.

15. The imaging device of claim 8, further comprising binning circuitry connected between the array and the pixel line buffer memories, the binning circuitry for binning pixel data to form video data during a video operating mode.

16. The imaging device of claim 15, wherein the array is configured as a 1080 p pixel array.

17. The imaging device of claim 15, wherein the array is configured as a 720 p pixel array.

* * * * *